(12) United States Patent  (10) Patent No.: US 7,489,473 B2
Yazawa  (45) Date of Patent: Feb. 10, 2009

(54) MAGNETIC RECORDING HEAD HAVING A SWITCHING LAYER WHICH MAY BE RENDERED NON-MAGNETIC BY HEATING

(75) Inventor: Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 356 days.

(21) Appl. No.: 11/338,005

(22) Filed: Jan. 24, 2006

(65) Prior Publication Data
US 2006/0171070 A1 Aug. 3, 2006

(30) Foreign Application Priority Data
Jan. 28, 2005 (JP) .............................. 2005-020504

(51) Int. Cl.
*G11B 5/17* (2006.01)
*G11B 5/187* (2006.01)
(52) U.S. Cl. .............................. 360/125.3; 360/125.31; 360/125.12
(58) Field of Classification Search ...... 360/324–324.2, 360/123.06, 123.12, 123.38, 123.4, 125.12, 360/125.3, 125.31, 125.71, 125.74
See application file for complete search history.

(56) References Cited

U.S. PATENT DOCUMENTS

| | | | | |
|---|---|---|---|---|
| 4,907,340 A | * | 3/1990 | Fang et al. | 29/610.1 |
| 6,650,598 B2 | * | 11/2003 | Sakakima et al. | 369/13.17 |
| 6,848,169 B2 | * | 2/2005 | Shin et al. | 29/603.14 |
| 2002/0008931 A1 | | 1/2002 | Hosokawa et al. | |
| 2002/0060882 A1 | | 5/2002 | Kidachi et al. | |
| 2002/0116978 A1 | | 8/2002 | Yamaguchi et al. | |
| 2004/0082161 A1 | | 4/2004 | Ho et al. | |

FOREIGN PATENT DOCUMENTS

| | | |
|---|---|---|
| JP | 58-008667 | 1/1983 |
| JP | 1-227279 | 9/1989 |
| JP | 2000-339894 | 12/2000 |
| JP | 2001-357644 | 12/2001 |
| JP | 2002-015410 | 1/2002 |
| JP | 2002-170351 | 6/2002 |
| JP | 2002-260358 | 9/2002 |
| JP | 2004-062946 | 2/2004 |
| JP | 2004-82161 | 3/2004 |
| JP | 2004-139676 | 5/2004 |

OTHER PUBLICATIONS

Notification of Reasons for Refusal for corresponding Japanese Patent Application Serial No. 2005-020504 dated May 29, 2007.

* cited by examiner

*Primary Examiner*—Jefferson Evans
(74) *Attorney, Agent, or Firm*—Brinks Hofer Gilson & Lione

(57) ABSTRACT

A magnetic head includes a first magnetic layer in which a face, opposed to a recording medium, having a size equal to a track width in a track width direction; a second magnetic layer in which a face, opposed to the recording medium, having a size greater than the track width in the track width direction, the first and second magnetic layers being spaced from each other in an element thickness direction, the first and second magnetic layers being connected to each other at a region located in a height direction; and a coil layer, located far from the opposed faces, for applying recording magnetic fields to the first and second magnetic layers such that magnetic data is recorded on the recording medium with a perpendicular magnetic field concentrated on the first magnetic layer.

6 Claims, 10 Drawing Sheets

MAGNETIC RECORDING HEAD HAVING A SWITCHING LAYER WHICH MAY BE RENDERED NON-MAGNETIC BY HEATING

BACKGROUND OF THE INVENTION

1. Field of the Invention

The present invention relates to magnetic heads for recording signals by applying magnetic fields perpendicular to recording media such as discs including hard layers. The present invention particularly relates to a magnetic head prevented from writing data on a recording medium during non-recording.

2. Description of the Related Art

FIG. 13 is a vertical sectional view of a known magnetic head H1. The magnetic head H1 is a type of perpendicular recording magnetic head for applying a magnetic field perpendicular to a recording medium M to perpendicularly magnetize a hard layer Ma included in the recording medium M. The magnetic head H1 has an opposed face opposed H1a to the recording medium M.

The recording medium M has, for example, a disc shape, further includes a soft layer Mb, and rotates on its center axis. The hard layer Ma is located far from the magnetic head H1 and has high coercive force. The soft layer Mb is located close to the magnetic head H1 and has high magnetic permeability.

A slider 1 is made of a non-magnetic material such as $Al_2O_3$—TiC and has an opposed face 1a opposed to the recording medium M. The rotation of the recording medium M creates an air flow, which separates the recording medium M from the slider 1 or allows the slider 1 to slide above the recording medium M. In FIG. 13, the movement direction of the recording medium M with respect to the slider 1 is referred to as an A direction.

The slider 1 has a trailing end face 1b. A non-magnetic insulating layer 2 made of an inorganic material such as $Al_2O_3$ or $SiO_2$ lies on the trailing end face 1b. A reading section $H_R$ lies on the non-magnetic insulating layer 2.

The reading section $H_R$ includes a lower shield layer 3, a reading element 4, an inorganic insulating layer (gap insulating layer) 5, and an upper shield layer 6. The inorganic insulating layer 5 lies between the lower shield layer 3 and the upper shield layer 6. The reading element 4 is located in the inorganic insulating layer 5 and is a type of magnetoresistive device such as an AMR device, a GMR device, or a TMR device.

A first coil-insulating base layer 7 lies on the upper shield layer 6 in that order and a plurality of second coil layers 8 made of a conductive material such as Cu are arranged on the first coil-insulating base layer 7.

The second coil layers 8 are covered with a first coil-insulating layer 9 made of an inorganic material such as $Al_2O_3$ or an organic material such as a resist.

A main magnetic pole layer 10 lies on the first coil-insulating layer 9. The main magnetic pole layer 10 extends from front end face 10c of the magnetic pole layer 10 in a height direction and has a predetermined length. The main magnetic pole layer 10 extends in a track width direction (the X direction in FIG. 13) and has a width equal to a track width Tw. The main magnetic pole layer 10 can be formed by, for example, a plating process and is made of a material, such as Ni—Fe, Co—Fe, or Ni—Fe—Co, having high saturation magnetic flux density.

A gap layer 13 made of an inorganic material such as $Al_2O_3$ or $SiO_2$ lies on the main magnetic pole layer 10.

A second coil-insulating base layer 14 lies on the gap layer 13 and first coil layers 15 made of Cu are arranged on the second coil-insulating base layer 14. The first and second coil layers 15 and 8 have end portions which arranged in the track width direction (X direction) and which are electrically connected to each other. The first and second coil layers 15 and 8 form a solenoidal coil layer that surrounds the main magnetic pole layer 10.

The first coil layers 15 are covered with a second coil-insulating layer 16 made of an inorganic material such as $Al_2O_3$ or an organic material such as a resist. A return path layer 17 made of a ferromagnetic material such as permalloy lies over the second coil-insulating layer 16 and the gap layer 13.

The return path layer 17 has a connecting section 17b. A lead layer 19 located close to the connecting section 17b extend from the first coil layers 15 in the height direction (Y direction) and lies on the second coil-insulating base layer 14. The return path layer 17 and the lead layer 19 are covered with a protective layer 20 made of an inorganic non-magnetic insulating material or another material.

In the magnetic head H1, if a recording current is applied between the first and second coil layers 15 and 8 through the lead layer 19, the current flowing between the first and second coil layers 15 and 8 induces a recording magnetic field around the main magnetic pole layer 10 and the return path layer 17. The magnetic flux φ1 of the recording magnetic field emanates from the front end face 10c of the main magnetic pole layer 10 and passes through the hard layer Ma and the soft layer Mb. This allows a recording signal to be written on the recording medium M. The magnetic flux φ1 returns to the front end face 17a of the return path layer 17.

With reference to FIG. 14, in the magnetic head H1, which is of a perpendicular magnetic recording type, the magnetization direction of the main magnetic pole layer 10 is perpendicular to the opposed face H1a during recording. The direction perpendicular to the opposed face H1a is the same as the direction of the magnetic shape anisotropy of the main magnetic pole layer 10. Therefore, the magnetization of the main magnetic pole layer 10 is likely to be directed perpendicularly to the opposed face H1a during non-recording. This causes an unintended signal to be written on the recording medium M. A reduction in the size of the main magnetic pole layer 10 and a reduction in track width cause this phenomenon to be serious.

In order to prevent unintended writing during non-recording, a magnetic head disclosed in Japanese Unexamined Patent Application Publication No. 2004-139676 (hereinafter referred to as Patent Document 1) includes a main magnetic pole layer and an auxiliary layer which is disposed thereon and which is rendered ferromagnetic or non-magnetic by light irradiation. The auxiliary layer is made of alloy containing K, Co, Fe, C, and N. The auxiliary layer is rendered non-magnetic by irradiation with a blue beam emitted from a blue semiconductor laser or rendered ferromagnetic by irradiation with a red beam emitted from a red semiconductor laser. During recording, the auxiliary layer is rendered non-magnetic by irradiation with the blue beam such that a recording operation is not disturbed. During non-recording, the auxiliary layer is rendered ferromagnetic by irradiation with the red beam. When the auxiliary layer is ferromagnetic, an end portion of the auxiliary layer has a large volume and has closure domains. This prevents the magnetization of the end portion of the auxiliary layer from being directed perpendicularly to a face of this magnetic head that is opposed to a recording medium. Patent Document 1 also discloses that the auxiliary layer is allowed to have magnetic anisotropy in the direction (a track width direction) parallel to the opposed face such that the magnetization of the end portion of the auxiliary layer is directed in parallel to the opposed face during non-recording.

The magnetic head disclosed in Patent Document 1 has problems below. Since magnetic phase transition is allowed to occur in the auxiliary layer by irradiation with a laser beam, a magnetic recording/reproducing apparatus must include a laser beam irradiation device. This causes a complication in the apparatus. Therefore, it is difficult to reduce the size and manufacturing cost of the apparatus.

Furthermore, the magnetization of the main magnetic pole layer must be directed in parallel to the opposed face against the magnetic shape anisotropy of the main magnetic pole layer and the auxiliary layer must be ferromagnetically coupled with the main magnetic pole layer tightly. In order to comply with an increase in recording density, the main magnetic pole layer must have a smaller size in the track width direction. The reduction in the size of the main magnetic pole layer decreases the bonding area between the auxiliary layer and the main magnetic pole layer, resulting in the reduction in the ferromagnetic coupling between the auxiliary layer and the main magnetic pole layer. In addition, the reduction in the size of the main magnetic pole layer in the track width direction increases the magnetic shape anisotropy perpendicular to the opposed face. This leads to difficulty in controlling the magnetic domains present in the end portions of the main magnetic pole layer.

SUMMARY OF THE INVENTION

The present invention is intended to solve the above problems. It is an object of the present invention to provide a magnetic head including a main magnetic pole layer prevented from unintended writing during non-recording.

A magnetic head according to the present invention includes a first magnetic layer in which a face, opposed to a recording medium, having a size equal to a track width in a track width direction; a second magnetic layer in which a face, opposed to the recording medium, having a size greater than the track width in the track width direction, the first and second magnetic layers being spaced from each other in an element thickness direction, the first and second magnetic layers being connected to each other at a region located in a height direction; and a coil layer, located far from the opposed faces, for applying recording magnetic fields to the first and second magnetic layers such that magnetic data is recorded on the recording medium with a perpendicular magnetic field concentrated on the first magnetic layer. A switching layer which is non-magnetic during recording and which is magnetic during non-recording is disposed in a space between the first and second magnetic layers, the space being located close to the opposed faces.

In the magnetic head, the switching layer is disposed in the space between the first and second magnetic layers. When the switching layer is rendered non-magnetic during recording with the magnetic head, the magnetization of the first magnetic layer is directed perpendicularly to the opposed faces and a magnetic field emanating from the front end face of the first magnetic layer to the recording medium is generated, whereby a magnetic recording signal is written on the recording medium.

Even if the magnetization of the first magnetic layer is directed perpendicularly to the opposed face when the magnetic head is put into a non-recording mode by stopping the supply of a current to the coil layer, a magnetic field emanating from the front end face of the first magnetic layer to outside the magnetic head can be prevented from being generated. This is because, a magnetic circuit including the first magnetic layer, the switching layer, and the second magnetic layer is formed by rendering the switching layer magnetic. Therefore, unintended data can be prevented from being written on the recording medium during non-recording.

In the magnetic head, the first magnetic layer magnetized perpendicularly to the opposed faces is not magnetized in parallel thereto. The magnetic head has a mechanism for creating the magnetic circuit in the magnetic head to prevent a magnetic field from emanating from the magnetic head. Therefore, the magnetic head requires a smaller amount of energy as compared to known magnetic heads. If the first magnetic layer is reduced in size in the track width direction so as to cope with an increase in recording density, any unintended signal can be securely prevented from being written on the recording medium during non-recording.

The switching layer preferably is made of a magnetic alloy. The magnetic alloy preferably has a Curie temperature lower than that of the first magnetic layer and that of the second magnetic layer. The switching layer is preferably rendered non-magnetic by heating the switching layer to a temperature higher than its Curie temperature when a signal is recorded on the recording medium. The switching layer is preferably rendered magnetic by reducing the temperature of the switching layer to a temperature lower than its Curie temperature during non-recording.

The switching layer is preferably made of a magnetic shunt alloy that becomes magnetic or non-magnetic at a temperature of 120° C. to 180° C. Examples of the magnetic shunt alloy include amorphous alloys containing a metalloid element and at least one selected from the group consisting of Fe, Co, and Ni. One of the amorphous alloys is represented by the formula $(Co_aFe_bNi_c)_uX_v$, wherein X represents at least one selected from the group consisting of P, B, Al, Si, and C, $0 \leq a \leq 1$, $0 \leq b \leq 1$, $0 \leq c \leq 1$, a+b+c=1, $0.75 \leq u \leq 0.80$, $0.20 \leq v \leq 0.25$, and u+v=1.00. Another one is represented by the formula $(Co_aFe_bNi_c)_wP_xB_yAl_z$, wherein $0 \leq a \leq 1$, $0 \leq b \leq 1$, $0 \leq c \leq 1$, a+b+c=1, $0.75 \leq w \leq 0.80$, $0.12 \leq x \leq 0.16$, $0.06 \leq y \leq 0.20$, $0 \leq z \leq 0.03$, and w+x+y+z=1.00.

The switching layer, the first magnetic layer, the second magnetic layer are preferably connected to each other directly. The magnetic head preferably further includes insulating layers each disposed between the switching layer and the first or second magnetic layer.

If the switching layer, the first magnetic layer, the second magnetic layer are directly connected to each other, a magnetic flux can be readily confined in the magnetic head. This is because the magnetic circuit including the first magnetic layer, the switching layer, and the second magnetic layer has low magnetic resistance when the switching layer becomes magnetic. If the insulating layers are each disposed between the switching layer and the first or second magnetic layer, the heat conduction between these layers can be reduced.

In the magnetic head, the front end face of the switching layer is preferably located close to the opposed faces and spaced from the opposed faces in the height direction. Therefore, a magnetic field can be prevented from being generated outside the magnetic head during non-recording.

In the magnetic head, the switching layer may be heated with the coil layer or a heating element other than the coil layer. Alternatively, the switching layer may be heated by supplying a current to the switching layer.

A magnetic head according to the present invention includes a first magnetic layer in which a face, opposed to a recording medium, having a size equal to a track width in a track width direction; a second magnetic layer in which a face, opposed to the recording medium, having a size greater than the track width in the track width direction, the first and second magnetic layers being spaced from each other in an element thickness direction, the first and second magnetic layers being connected to each other at a region located in a height direction; and a coil layer, located far from the opposed faces, for applying recording magnetic fields to the first and second magnetic layers such that magnetic data is recorded on the recording medium with a perpendicular magnetic field concentrated on the first magnetic layer. A layer made of a magnetic shunt alloy is disposed in a space between the first and second magnetic layers, the space being located close to the opposed faces.

In this magnetic head, the magnetic shunt alloy preferably has a Curie temperature lower than that of the first magnetic layer and that of the second magnetic layer. Therefore, the layer made of the magnetic shunt alloy can be rendered magnetic or non-magnetic by varying the temperature of the layer.

In the magnetic head, the switching layer is disposed in the space between the first and second magnetic layers. When the switching layer is rendered non-magnetic during recording with the magnetic head, the magnetization of the first magnetic layer is directed perpendicularly to the opposed faces and a magnetic field emanating from the front end face of the first magnetic layer to the recording medium is generated, whereby a magnetic recording signal is written on the recording medium. Even if the magnetization of the first magnetic layer is directed perpendicularly to the opposed face when the magnetic head is put into a non-recording mode by stopping the supply of a current to the coil layer, a magnetic field emanating from the front end face of the first magnetic layer to outside the magnetic head can be prevented from being generated. This is because, a magnetic circuit including the first magnetic layer, the switching layer, and the second magnetic layer is formed by rendering the switching layer magnetic. Therefore, unintended data can be prevented from being written on the recording medium during non-recording.

DESCRIPTION OF THE PREFERRED EMBODIMENTS

Figure 1:
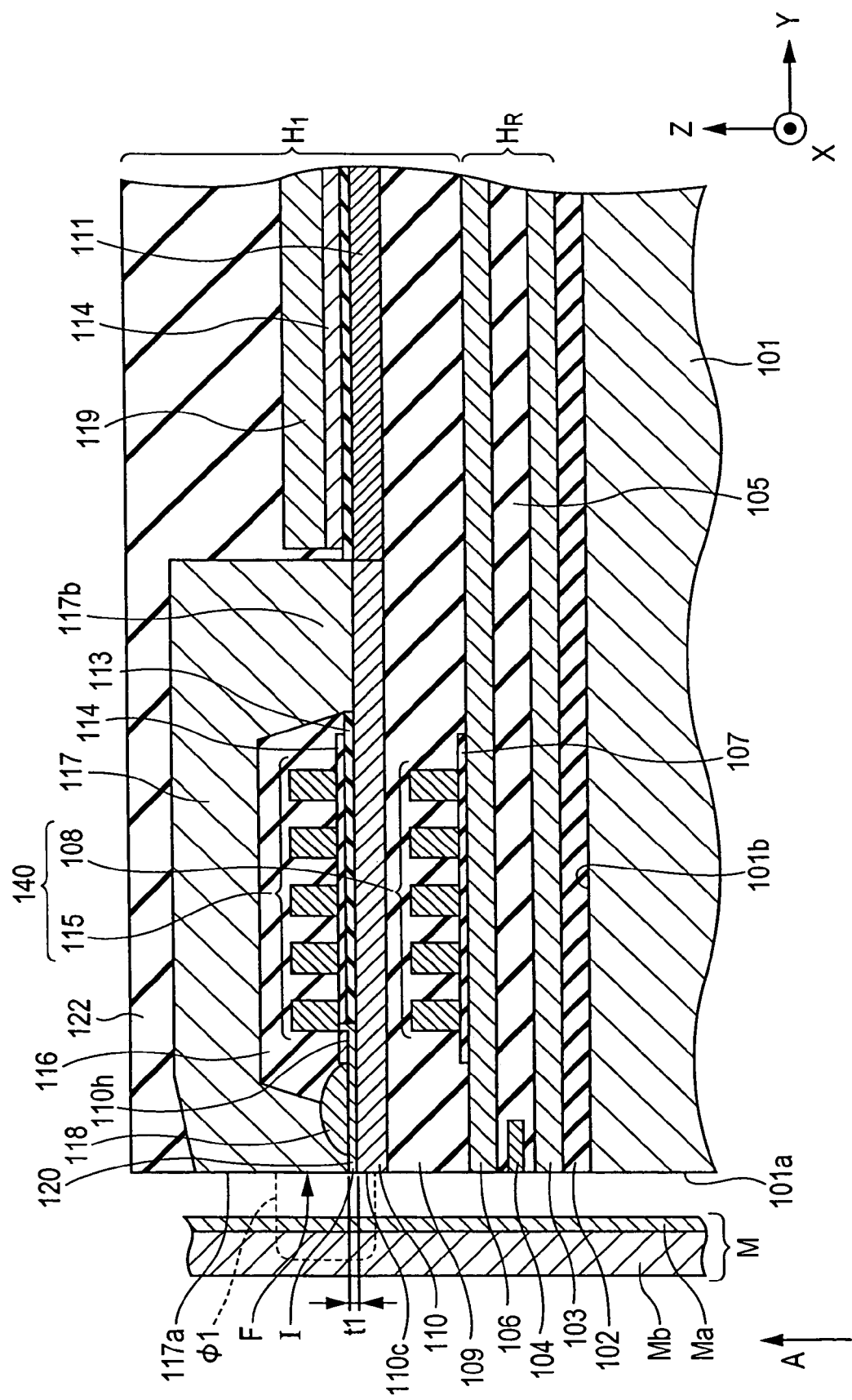
FIG. 1 is a vertical sectional view of a magnetic head according to a first embodiment of the present invention.

FIG. 1 is a vertical sectional view of a magnetic head according to a first embodiment of the present invention. The magnetic head is represented by reference numeral H1 in FIG. 1 and is a type of perpendicular recording magnetic head for applying a magnetic field perpendicular to a recording medium M to perpendicularly magnetize a hard layer Ma included in the recording medium M. The magnetic head H1 has an opposed face H1a opposed to the recording medium M.

The recording medium M has, for example, a disc shape, further includes a soft layer Mb, and rotates on its center axis. The hard layer Ma is located close to the magnetic head H1 and has high coercive force. The soft layer Mb is located far from the magnetic head H1 and has high magnetic permeability.

A slider 101 is made of a non-magnetic material such as $Al_2O_3$—TiC and has an opposed end face 101a opposed to the recording medium M. The rotation of the recording medium M creates an air flow, which separates the recording medium M from the slider 101 or allows the slider 101 to slide above the recording medium M. In FIG. 1, the movement direction of the recording medium M with respect to the slider 101 is referred to as an A direction.

The slider 101 has a trailing side face 101b. A non-magnetic insulating layer 102 made of an inorganic material such as $Al_2O_3$ or $SiO_2$ lies on the trailing side face 101b. A reading section $H_R$ lies on the non-magnetic insulating layer 102.

The reading section $H_R$ includes a lower shield layer 103, a reading element 104, an inorganic insulating layer (gap insulating layer) 105, and an upper shield layer 106. The inorganic insulating layer 105 lies between the lower shield layer 103 and the upper shield layer 106. The reading element 104 is located in the inorganic insulating layer 105 and is a type of magnetoresistive effect device such as an AMR device, a GMR device, or a TMR device.

A first coil-insulating base layer 107 lies on the upper shield layer 106 and a plurality of second coil layers (second coil pieces) 108 made of a conductive material are arranged on the first coil-insulating base layer 107. In particular, the second coil layers 108 are made of, for example, a conductive metal material such as Cu.

The second coil layers 108 are covered with a first coil-insulating layer 109 made of an inorganic insulating material such as $Al_2O_3$ or an organic insulating material such as a resist.

The upper face of the first coil-insulating layer 109 is flat and could have a plating base layer disposed thereon. A main magnetic pole layer (a first magnetic layer) 110 lies on the first coil-insulating layer 109. The main magnetic pole layer 110 extends from the opposed face H1a in a height direction (the Y direction in FIG. 1) and has a predetermined length L2. The main magnetic pole layer 110 extends in a track width direction (the X direction in FIG. 1) and has a width equal to a track width Tw. The main magnetic pole layer 110 includes a rear section which has a width greater than the track width Tw and which has a length L3. The main magnetic pole layer 110 has a thickness of about 0.3 μm. The main magnetic pole layer 110 can be formed by a plating process and is made of a ferromagnetic material, such as Ni—Fe, Co—Fe, or Ni—Fe—Co, having high magnetic flux density.

Figure 2:
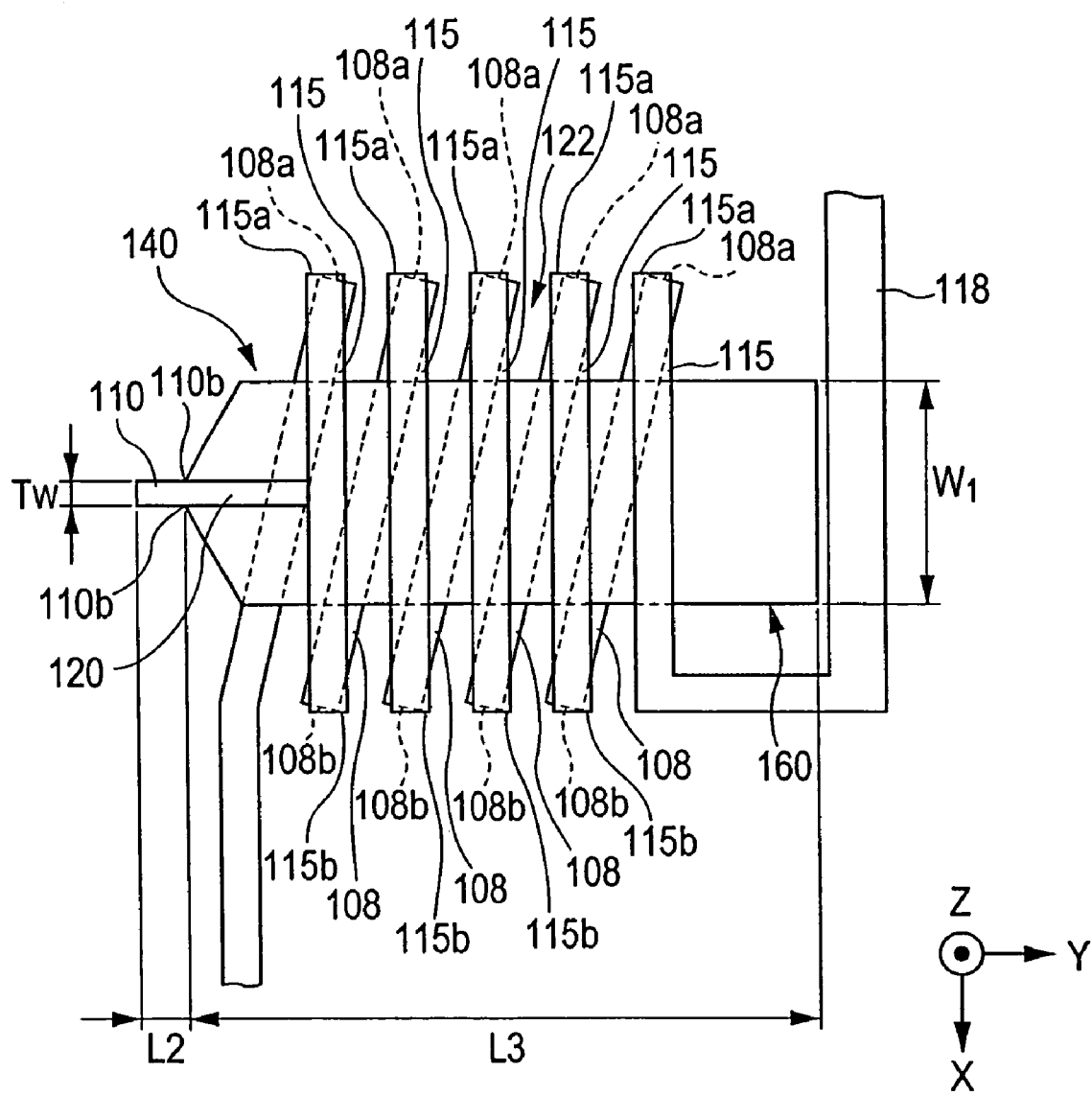
FIG. 2 is a fragmentary plan view of the magnetic head shown in FIG. 1.

With reference to FIG. 2, in particular, the track width Tw is equal to 0.03 to 0.5 μm and the length L2 is equal to 0.03 to 0.5 μm.

With reference to FIG. 1, a first insulating layer 113 made of an inorganic material such as $Al_2O_3$ or $SiO_2$ lies on the main magnetic pole layer 110. A switching layer 120, which can be rendered non-magnetic by heating, is located on the side of the first insulating layer 113 that is close to the opposed face H1a, that is, the side of the first insulating layer 113 that is opposite to the Y direction. The counter substrate 120 is described below in detail.

A plurality of first coil layers (first coil pieces) 115 are arranged on the first insulating layer 113. The first coil layers 115 as well as the second coil layers 108 are made of a conductive metal material such as Cu.

With reference to FIG. 2, the first coil layers 115 have first end portions 115a and second end portions 115b arranged in the track width direction (the X direction in FIG. 2) and the second coil layers 108 have third end portions 108a and fourth end portions 108b arranged in the track width direction (the X direction in FIG. 2). The first end portions 115a are each electrically connected to the corresponding third end portions 108a and the second end portions 115b are each electrically connected to the corresponding fourth end portions 108b. The first and second coil layers 115 and 108 form a solenoidal coil layer 140 surrounding the main magnetic pole layer 110.

Figure 3:
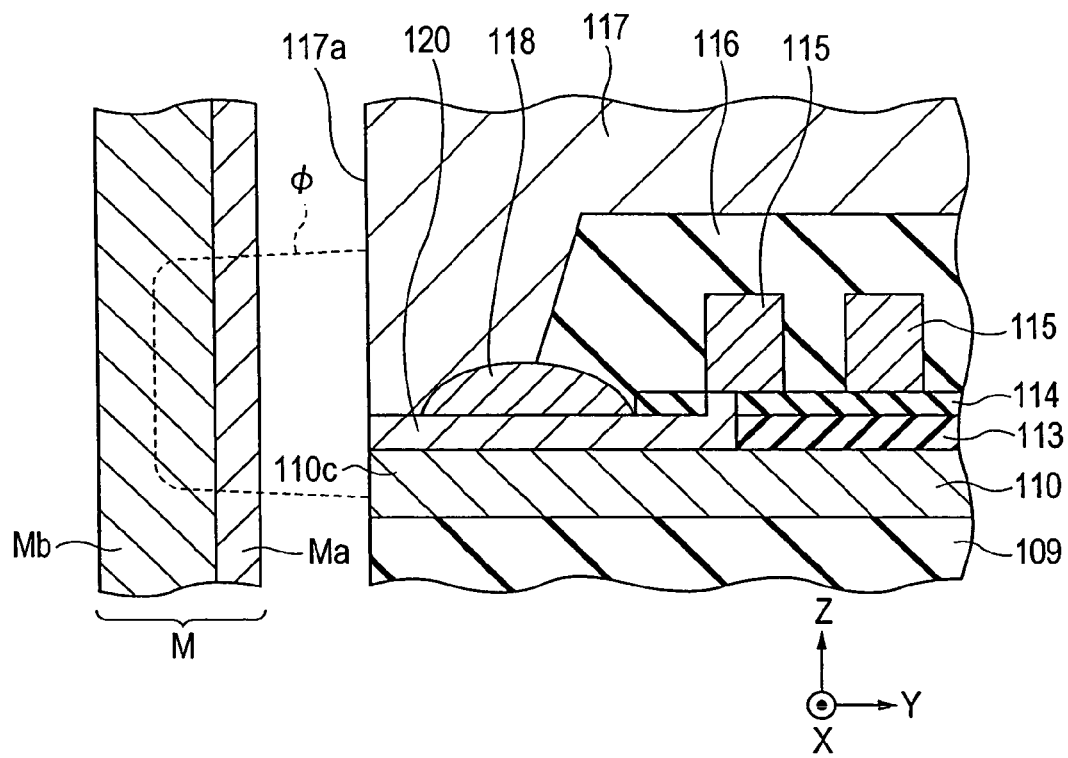
FIG. 3 is an enlarged fragmentary sectional view of the periphery of a face of the magnetic head in a recording mode, the face being opposed to a recording medium.

With reference to FIG. 3, the first coil layers 115 are covered with a second coil-insulating layer 116 made of an inorganic insulating material such as $Al_2O_3$ or an organic insulating material such as a resist. A return path layer 117 which is a second magnetic layer according to the present invention lies over the second coil-insulating layer 116 and the first insulating layer 113. The return path layer 117 is made of a ferromagnetic material such as permalloy.

In the opposed face H1a, the front end face 110c of the main magnetic pole layer 110 has an area sufficiently less than that of the front end face 117a of the return path layer 117. Therefore, the magnetic flux φ of a leakage recording magnetic field is concentrated on the front end face 110c of the main magnetic pole layer 110. The hard layer Ma is perpendicularly magnetized due to the magnetic flux φ, whereby magnetic data is recorded on the recording medium M.

The front end face 117a of the return path layer 117 is exposed at the opposed face H1a opposed to the recording medium M. The return path layer 117 includes a connecting section 117b located far from the opposed face H1a. The connecting section 117b is connected to the main magnetic pole layer 110. This leads to the formation of a magnetic path extending from the main magnetic pole layer 110 to return path layer 117.

A Gd decision layer 118 made of an inorganic or organic material is located at a position which is present on the first insulating layer 113 and which is spaced from the opposed face H1a at a predetermined distance. The distance between the opposed face H1a and the front end of the Gd decision layer 118 corresponds to the gap depth of the magnetic head H1.

A lead layer 119 is spaced from the first coil layers 115 and located in the height direction (the Y direction) of the connecting section 117b of the return path layer 117. The return path layer 117 and the lead layer 119 are covered with a protective layer 122 made of a non-magnetic insulating inorganic material.

In the magnetic head H1, if a recording current is applied between the first and second coil layers 115 and 108 through the lead layer 119, the current flowing between the first and second coil layers 115 and 108 induces a recording magnetic field around the main magnetic pole layer 110 and the return path layer 117. In the opposed face H1a, the magnetic flux φ1 of the recording magnetic field emanates from the front end face 110c of the main magnetic pole layer 110 and passes through the hard layer Ma and then the soft layer Mb. This allows a recording signal to be written on the recording medium M. The magnetic flux φ1 returns to the front end face 117a of the return path layer 117.

Features of the magnetic head H1 will now be described. With reference to FIG. 1, the switching layer 120 is disposed in a space I, located close to the opposed face H1a, between the main magnetic pole layer 110 and the return path layer 117. The switching layer 120 is located more close to the opposed face H1a than the solenoidal coil layer 140.

The switching layer 120 is non-magnetic while magnetic signals are being recorded on the recording medium M but the switching layer 120 is magnetic during non-recording. The switching layer 120 is made of a magnetic alloy, which has a Curie temperature lower than that of the main magnetic pole layer 110 and that of the return path layer 117. When a signal is recorded on the recording medium M, the switching layer 120 is rendered non-magnetic by heating the switching layer 120 to a temperature higher than its Curie temperature. In contrast, during non-recording, the switching layer 120 is rendered magnetic by reducing the temperature of the switching layer 120 to a temperature lower than its Curie temperature.

The magnetic alloy is preferably a type of magnetic shunt alloy that becomes magnetic or non-magnetic at a temperature of 120° C. to 180° C. If the switching layer 120 has a Curie temperature of lower than 120° C., the switching layer 120 is non-magnetic during operation because the operating temperature of a hard disk drive including the magnetic head H1 exceeds the Curie temperature of the switching layer 120. In contrast, if the switching layer 120 has a Curie temperature of higher than 180° C., the following problems can occur when the switching layer 120 is heated to higher than 180° C. so as to become non-magnetic: a problem that the opposed face H1a is thermally expanded to contact the recording medium M and a problem that a magnetic flux sufficient for magnetic recording can hardly generated because the main magnetic pole layer 110 has low saturation magnetic flux density.

Examples of the magnetic shunt alloy include amorphous alloys containing a metalloid element and at least one selected from the group consisting of Fe, Co, and Ni. One of the amorphous alloys is represented by the formula $(Co_aFe_bNi_c)_uX_v$, wherein X represents at least one selected from the group consisting of P, B, Al, Si, and C, $0 \leq a \leq 1$, $0 \leq b \leq 1$, $0 \leq c \leq 1$, $a+b+c=1$, $0.75 \leq u \leq 0.80$, $0.20 \leq v \leq 0.25$, and $u+v=1.00$. Another one is represented by the formula $(Co_aFe_bNi_c)_wP_xB_yAl_z$, wherein $0 \leq a \leq 1$, $0 \leq b \leq 1$, $0 \leq c \leq 1$, $a+b+c=1$, $0.75 \leq w \leq 0.80$, $0.12 \leq x \leq 0.16$, $0.06 \leq y \leq 0.20$, $0 \leq z \leq 0.03$, and $w+x+y+z=1.00$. The switching layer 120 can be formed by a plating process, a sputtering process, or another process.

Figure 4:
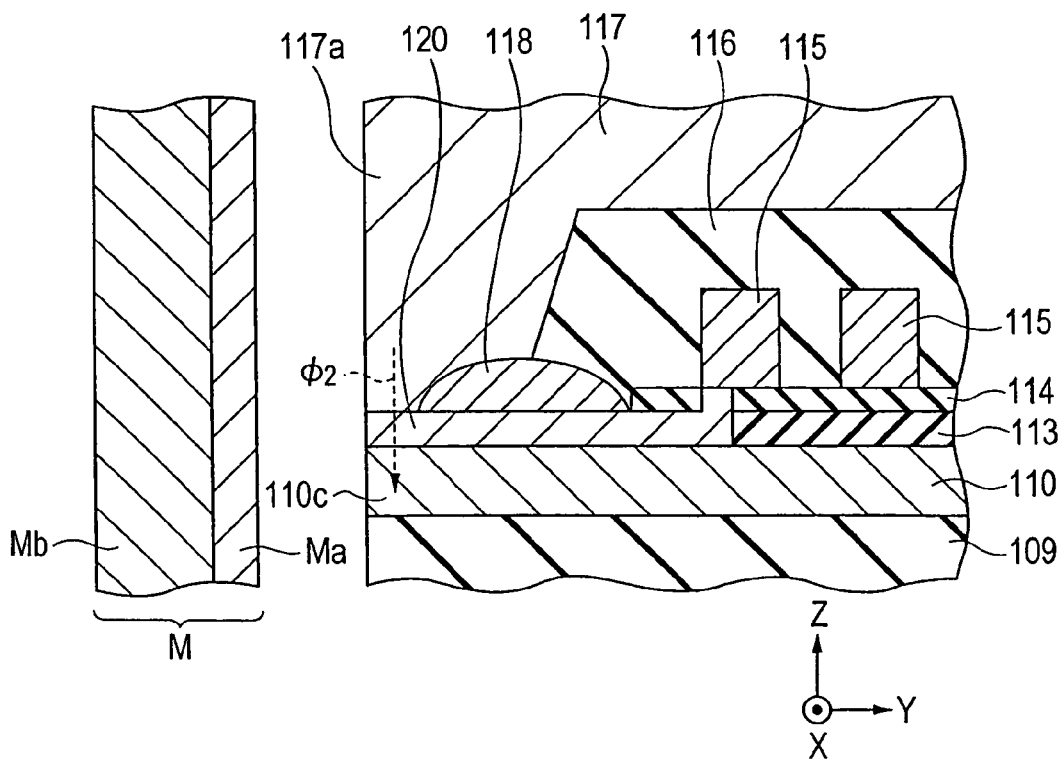
FIG. 4 is an enlarged fragmentary sectional view of the periphery of the opposed face of the magnetic head in a non-recording mode.

FIG. 3 is an enlarged fragmentary sectional view of the periphery of a gap layer included in the magnetic head H1 in a recording mode. FIG. 4 is an enlarged fragmentary sectional view of the periphery of the gap layer in a non-recording mode.

With reference to FIG. 3, if the switching layer 120 is rendered non-magnetic during recording with the magnetic head H1, the magnetization of the main magnetic pole layer 110 is directed perpendicularly to the opposed face H1a and a magnetic field emanating from the front end face 110c of the main magnetic pole layer 110 to the recording medium M is generated, whereby magnetic recording signals are written on the recording medium M. Even if the magnetization of the main magnetic pole layer 110 is directed perpendicularly to the opposed face H1a when the magnetic head H1 is put into a non-recording mode by stopping the supply of a current to the solenoidal coil layer 140, a magnetic field emanating from the front end face 110c of the main magnetic pole layer 110 to outside the magnetic head H1 can be prevented from being generated. This is because, in this embodiment, a magnetic circuit φ2 including the main magnetic pole layer 110, the switching layer 120, and the return path layer 117 is formed by rendering the switching layer 120 magnetic. Therefore, as shown in FIG. 4, unintended data can be prevented from being written on the recording medium M during non-recording.

In the magnetic head H1, the main magnetic pole layer 110 magnetized perpendicularly to the opposed face H1a is not magnetized in parallel thereto. The magnetic head H1 has a mechanism for creating the magnetic circuit φ2 in the magnetic head H1 to prevent a magnetic field from emanating from the magnetic head H1. Therefore, the magnetic head H1 requires a smaller amount of energy as compared to known magnetic heads. If the main magnetic pole layer 110 is reduced in size in the track width direction so as to cope with an increase in recording density, unintended data can be securely prevented from being written on the recording medium M during non-recording.

In this embodiment, the switching layer 120 is connected to the first coil layers 115. Therefore, during recording with the magnetic head H1, the switching layer 120 is heated to a temperature higher than its Curie temperature by supplying a current to the solenoidal coil layer 140, whereby the switching layer 120 is rendered non-magnetic. In contrast, during non-recording, the temperature of the switching layer 120 is reduced to a temperature lower than its Curie temperature by stopping heating, whereby the switching layer 120 is rendered magnetic.

In this embodiment, the main magnetic pole layer 110, the switching layer 120, and the return path layer 117 are directly connected to each other. Therefore, when the switching layer 120 is magnetic, the magnetic circuit φ2 including the main magnetic pole layer 110, the switching layer 120, and the return path layer 117 has low magnetic resistance. This allows a magnetic flux to be readily confined in the magnetic head H1.

Figure 5:
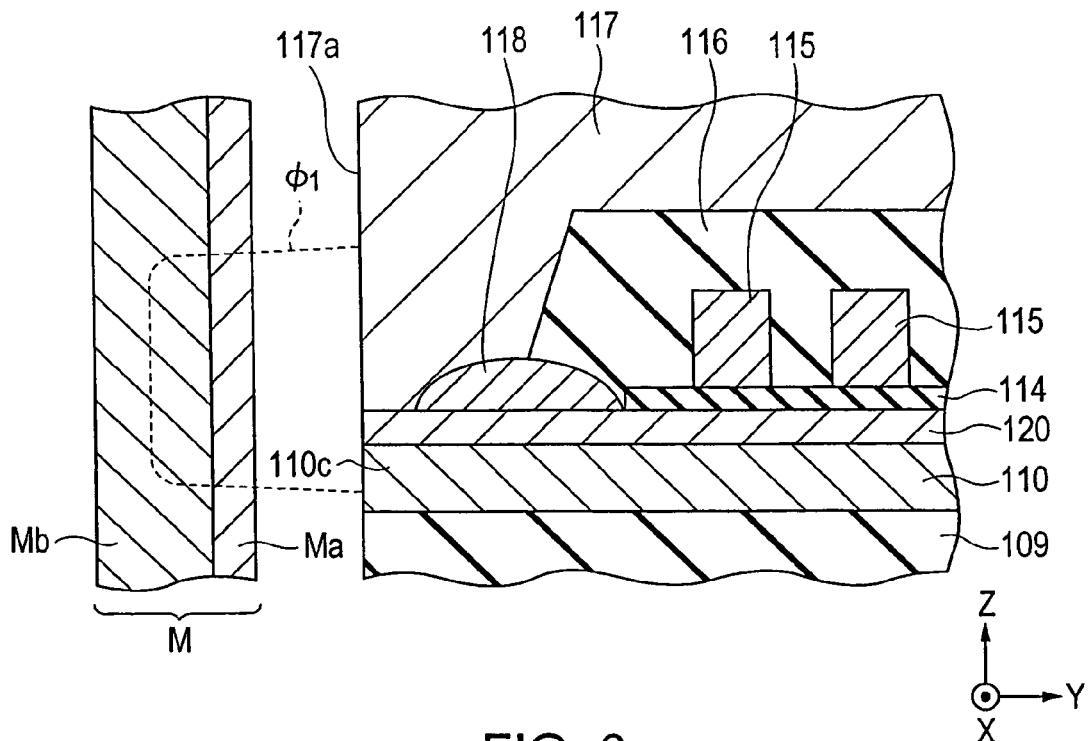
FIG. 5 is an enlarged fragmentary sectional view of the periphery of the periphery of a face of a magnetic head according to a second embodiment of the present invention, the face being opposed to a recording medium.

In the magnetic head H1, the switching layer 120 is connected to the first coil layers 115 and heated by heat generated from the first coil layers 115. However, the switching layer 120 need not be necessarily connected to the first coil layers 115 directly and a portion of the switching layer 120 may be located close to the first coil layers 115 such that Joule heat generated from the first coil layers 115 is conducted to the switching layer 120. FIG. 5 shows a magnetic head according to a second embodiment of the present invention. This magnetic head has a face opposed to a recording medium and includes a switching layer 120 extending from the opposed face in a height direction (the Y direction in FIG. 5), an insulating layer 114, and first coil layers 115, these layers being arranged in that order. Joule heat generated from these first coil layers 115 can be conducted to this switching layer 120 during recording by adjusting the thickness of this insulating layer 114. Therefore, this switching layer 120 can be heated to a temperature higher than its Curie temperature such that this switching layer 120 becomes non-magnetic. Since these first coil layers 115 are electrically insulated from this switching layer 120, electric properties of these first coil layers 115 can be prevented from being varied. This switching layer 120 extending in the height direction may have any length.

Figure 6:
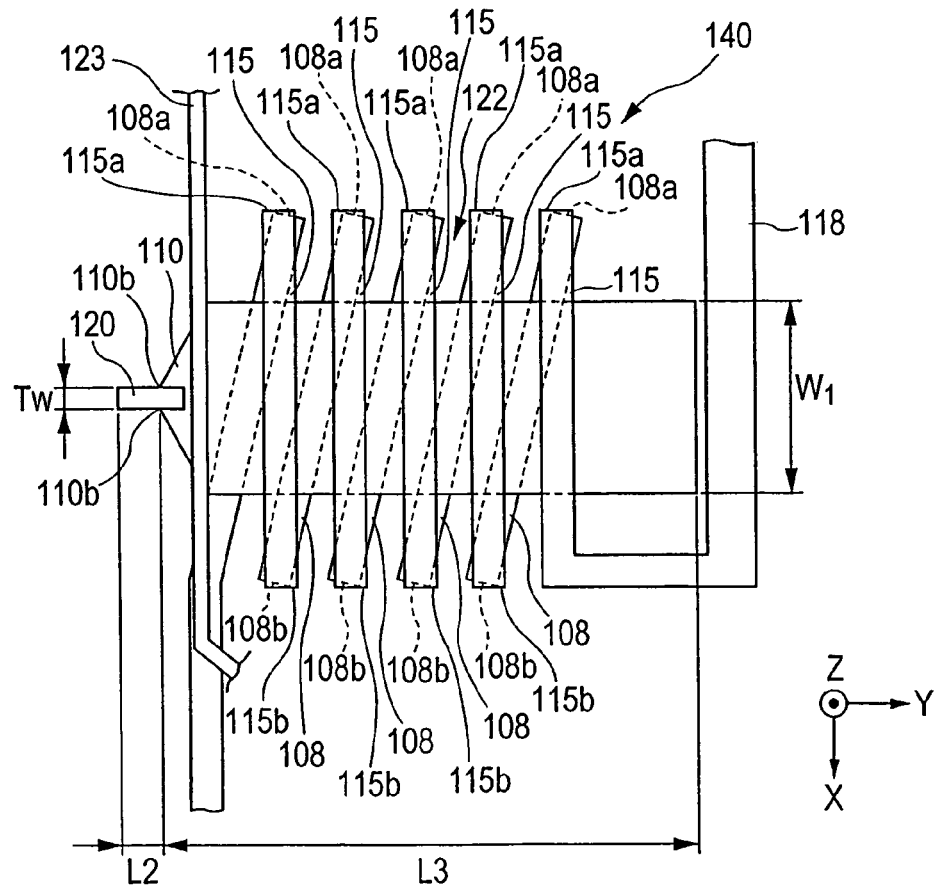
FIG. 6 is a fragmentary plan view of a magnetic head according to a third embodiment of the present invention.
Figure 7:
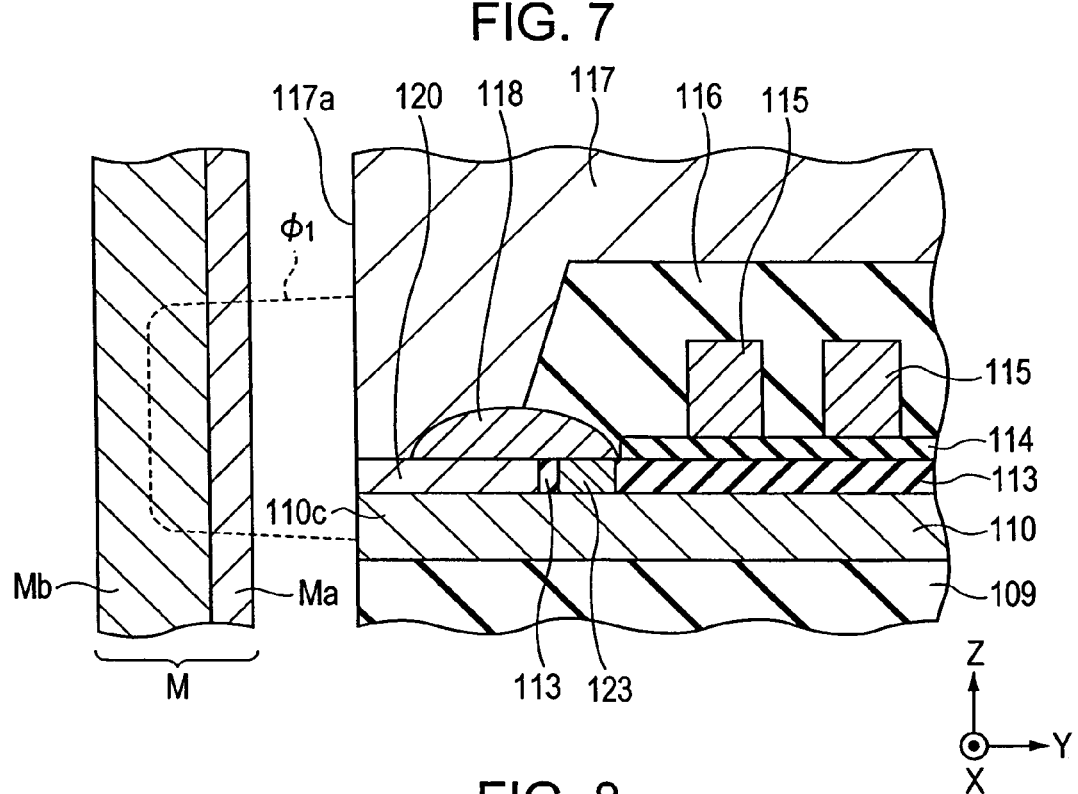
FIG. 7 is an enlarged fragmentary sectional view of the periphery of a face of the magnetic head shown in FIG. 6, the face being opposed to a recording medium.

FIG. 6 shows a magnetic head according to a third embodiment of the present invention. This magnetic head has a face opposed to a recording medium and includes first coil layers 115, a switching layer 120, an insulating layer 113 (see FIG. 7), and a heater layer 123 which is spaced from these first coil layers 115 and which is located close to this switching layer 120. FIG. 7 is an enlarged fragmentary sectional view showing the periphery of the opposed face of this magnetic head. With reference to FIG. 7, this switching layer 120, this insulating layer 113, and this heater layer 123 are arranged in the Y direction in that order. This heater layer 123 is made of a conductive material such as Cu, Ni—Cu, Ni—Cr, Ta, or W. During recording with the magnetic head, a current is supplied to this heater layer 123 simultaneously with the supply of a current to these first coil layers 115. This allows this switching layer 120 to be heated to a temperature higher than its Curie temperature, whereby this switching layer 120 is rendered magnetic. In this magnetic head, since this heater layer 123 is spaced from these first coil layers 115, it is possible to prevent discharge between this magnetic head and a recording medium and other problems. This leads to an increase in the reliability of this magnetic head.

Figure 8:
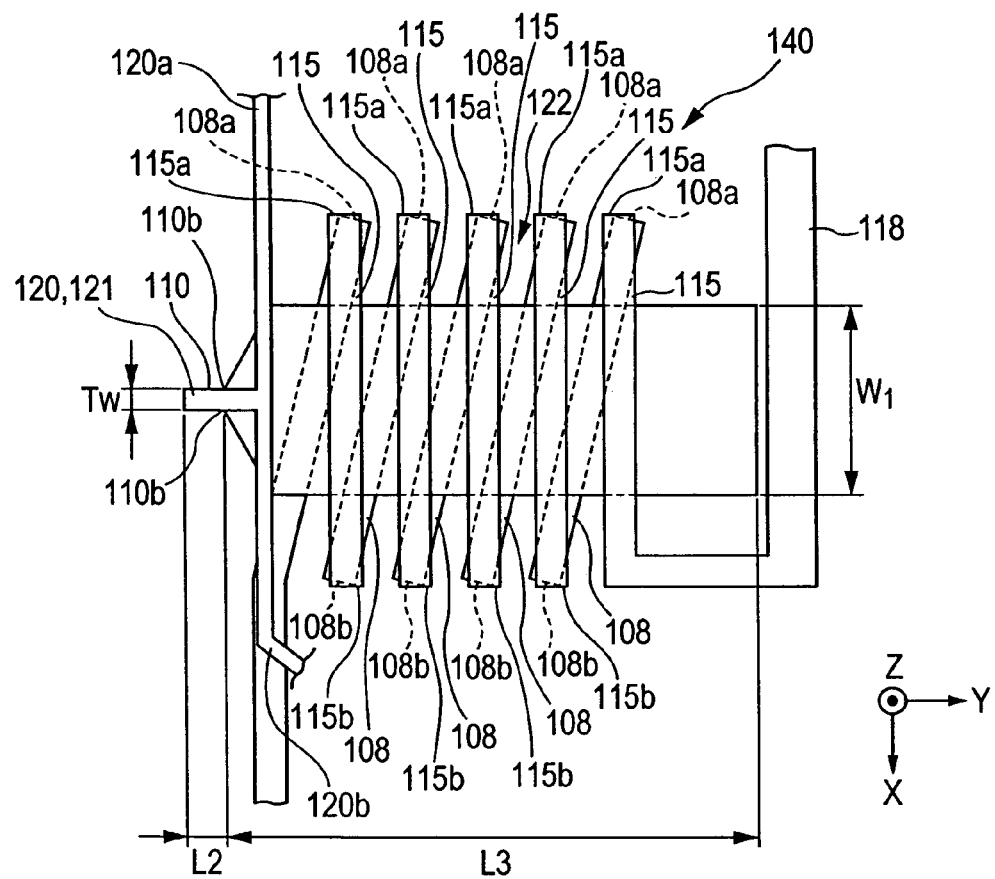
FIG. 8 is a fragmentary plan view of a magnetic head according to a fourth embodiment of the present invention.
Figure 9:
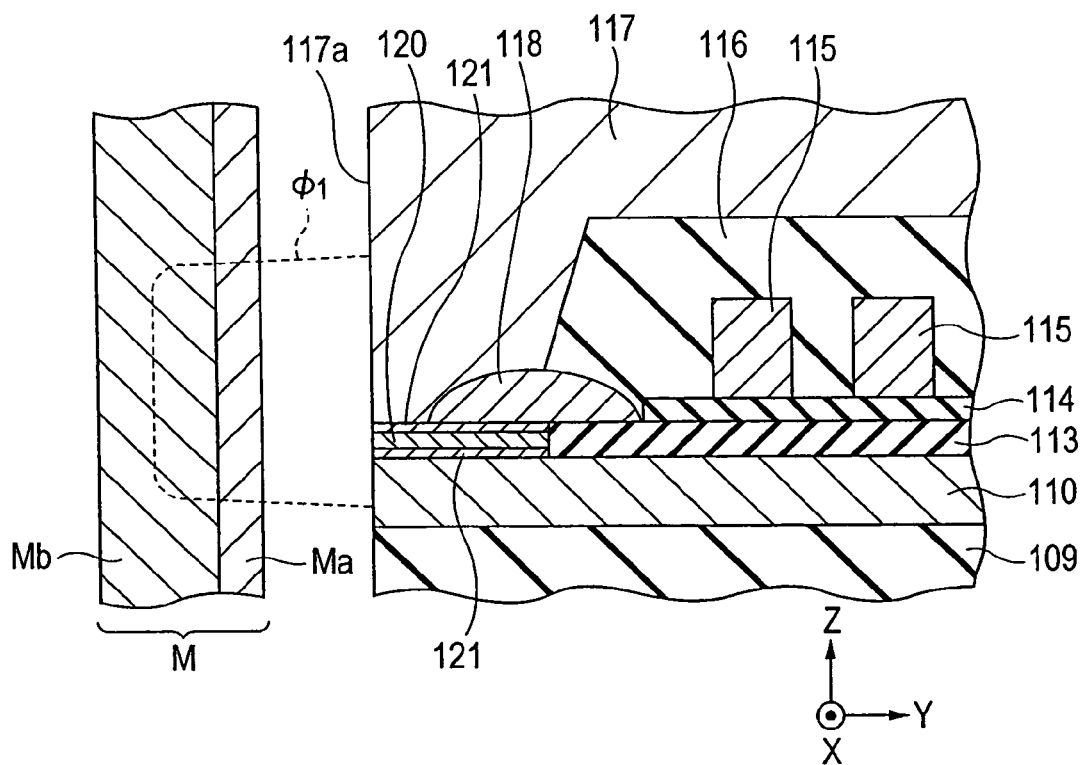
FIG. 9 is an enlarged fragmentary sectional view of the periphery of a face of the magnetic head shown in FIG. 8, the face being opposed to a recording medium.

FIG. 8 shows a magnetic head according to a fourth embodiment of the present invention. This magnetic head includes a switching layer 120 including a first current supply section 120a and a second current supply section 120b, a main magnetic pole layer 110, a return path layer 117, and insulating layers 121. Notice a return path 117 is overlapped on embodiment of FIG. 8 and are not shown. During recording, Joule heat is generated from this switching layer 120 in such a manner that a current is supplied to this switching layer 120 through this first or second current supply section 120a or 120b. The current supplied to the switching layer 120 must be prevented from being split between this main magnetic pole layer 110 and this return path layer 117. Therefore, as shown in FIG. 9, one of these insulating layers 121 is placed between this switching layer 120 and this main magnetic pole layer 110 and another one is placed between this switching layer 120 and this return path layer 117. This leads to a reduction in the heat conduction between these layers. Furthermore, recording properties of this magnetic head can be prevented from being deteriorated due to an increase in the temperature of this switching layer 120.

Figure 10:
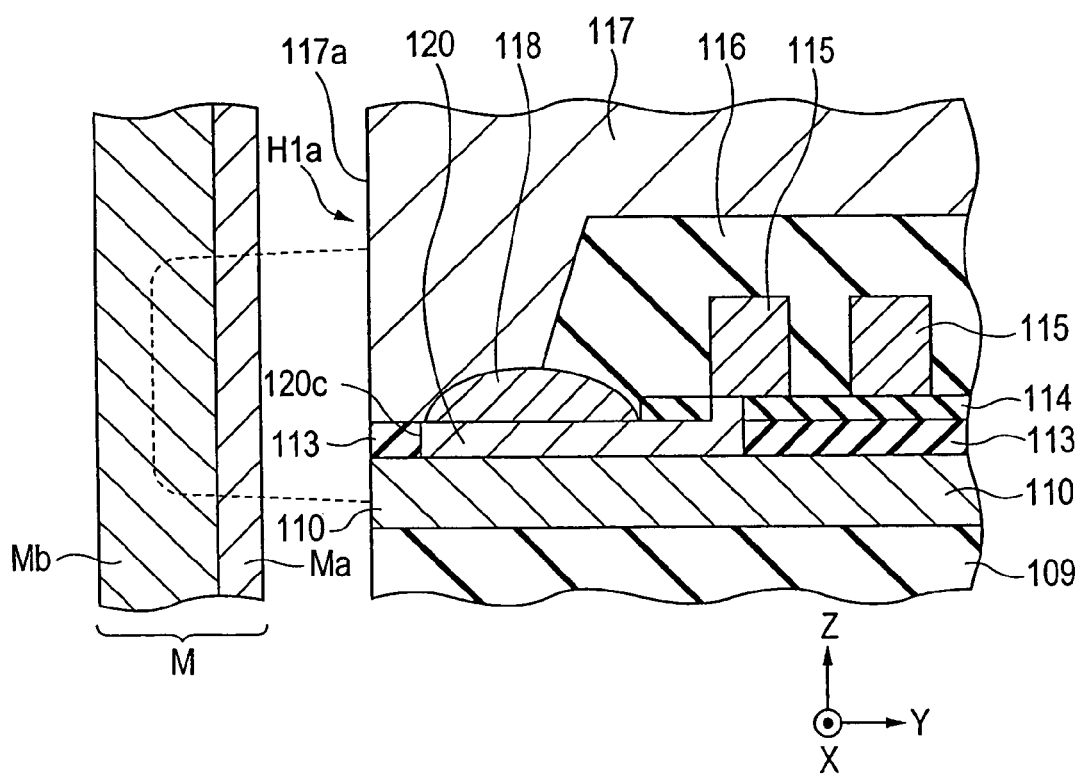
FIG. 10 is an enlarged fragmentary sectional view of a magnetic head according to a fifth embodiment of the present invention.

FIG. 10 shows a magnetic head according to a fifth embodiment of the present invention. This magnetic head has an opposed face H1a opposed to a recording medium and includes an insulating layer 113 and a switching layer 120 having a front end face 120c. The front end face 120c of this switching layer 120 is spaced from the opposed face H1a of this magnetic head in a height direction (the Y direction in FIG. 10) and this insulating layer 113 is located between the opposed face H1a of this magnetic head and the front end face 120c of this switching layer 120. This configuration is preferable because a magnetic field emanating from this magnetic head can be prevented from being generated during recording.

Figure 11:
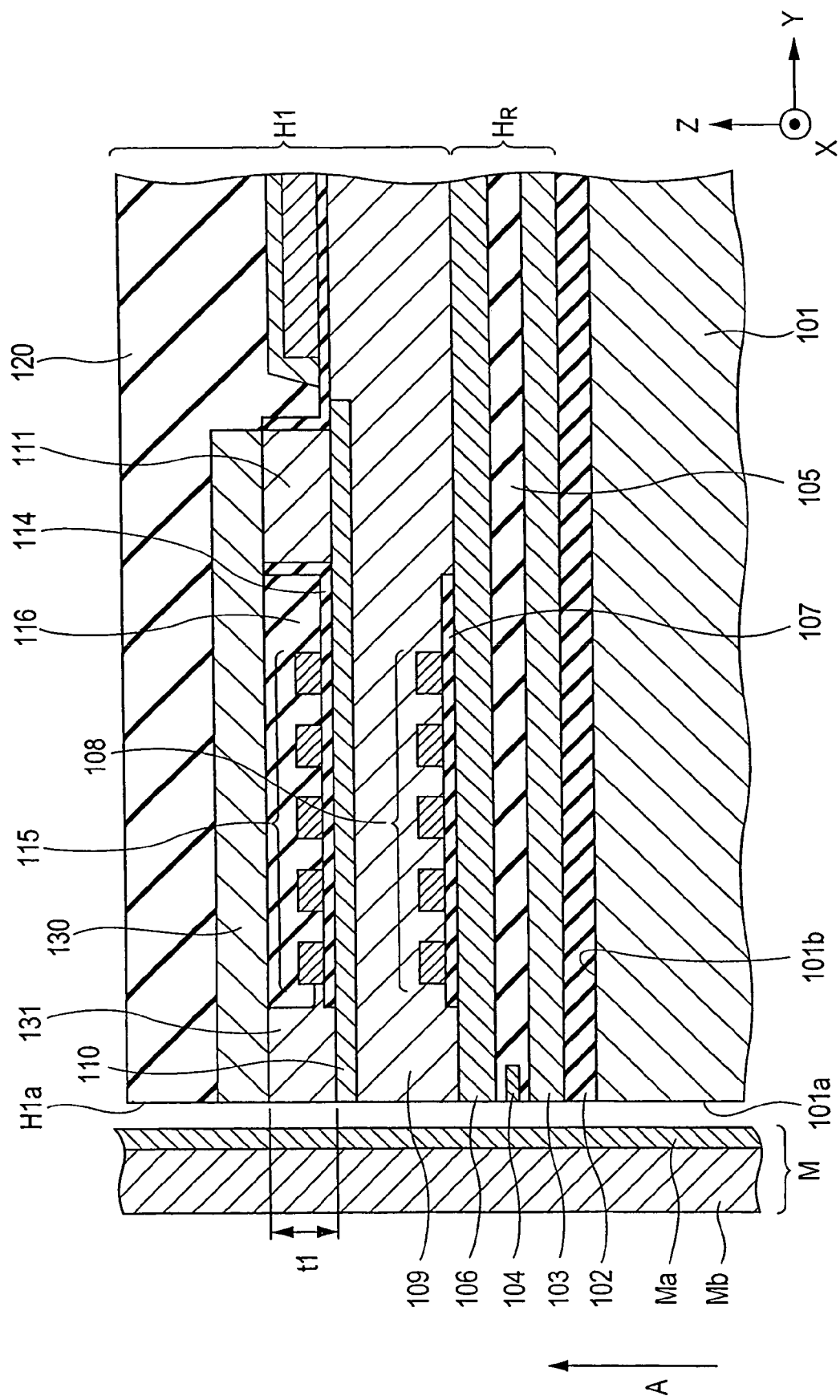
FIG. 11 is a vertical sectional view of a magnetic head according to a sixth embodiment of the present invention.

FIG. 11 is a vertical sectional view of a magnetic head according to a sixth embodiment of the present invention. This magnetic head has a face opposed to a recording medium and includes a return path layer 117, a main magnetic pole layer 110, and a connecting layer 111 made of a magnetic material. This magnetic head is different from the magnetic head H1 shown in FIG. 1 in that this return path layer 117 has a flat structure and is connected to this main magnetic pole layer 110 with the connecting layer 111 disposed therebetween. The distance t1 between this main magnetic pole layer 110 and this return path layer 117 is greater than that shown in FIG. 1.

This magnetic head further includes a switching layer 131 disposed between this main magnetic pole layer 110 and this return path layer 117.

This switching layer 131 is non-magnetic while magnetic signals are being recorded on the recording medium with this magnetic head; however, this switching layer 131 is magnetic during non-recording. This switching layer 131 is made of a magnetic alloy, which has a Curie temperature higher than that of this main magnetic pole layer 110 and that of this return path layer 117. This switching layer 131 is rendered non-magnetic by heating this switching layer 131 to a temperature higher than its Curie temperature when a signal is recorded on the recording medium. This switching layer 131 is rendered magnetic by reducing the temperature of this switching layer 131 to a temperature lower than its Curie temperature during non-recording.

The magnetic alloy is preferably a type of magnetic shunt alloy that becomes magnetic or non-magnetic at a temperature of 120° C. to 180° C. Examples of the magnetic shunt alloy include amorphous alloys containing a metalloid element and at least one selected from the group consisting of Fe, Co, and Ni. One of the amorphous alloys is represented by the formula $(Co_aFe_bNi_c)_uX_v$, wherein X represents at least one selected from the group consisting of P, B, Al, Si, and C, $0 \leq a \leq 1$, $0 \leq b \leq 1$, $0 \leq c \leq 1$, $a+b+c=1$, $0.75 \leq u \leq 0.80$, $0.20 \leq v \leq 0.25$, and $u+v=1.00$. Another one is represented by the formula $(Co_aFe_bNi_c)_wP_xB_yAl_z$, wherein $0 \leq a \leq 1$, $0 \leq b \leq 1$, $0 \leq c \leq 1$, $a+b+c=1$, $0.75 \leq w \leq 0.80$, $0.12 \leq x \leq 0.16$, $0.06 \leq y \leq 0.20$, $0 \leq z \leq 0.03$, and $w+x+y+z=1.00$.

If this switching layer 131 is rendered non-magnetic during recording with this magnetic head, the magnetization of this main magnetic pole layer 110 is directed perpendicularly to the opposed face of this magnetic head and a magnetic field emanating from the front end face of this main magnetic pole layer 110 to the recording medium is generated, whereby magnetic recording signals are written on the recording medium. Even if the magnetization of this main magnetic pole layer 110 is directed perpendicularly to the opposed face of this magnetic head when this magnetic head is put into a non-recording mode by stopping the supply of a current to a coil layer included in this magnetic head, a magnetic field emanating from the front end face of this main magnetic pole layer 110 to outside this magnetic head can be prevented from being generated. This is because, in this embodiment, a magnetic circuit including this main magnetic pole layer 110, this switching layer 131, and this return path layer 117 is formed by rendering this switching layer 131 magnetic. Therefore, unintended data can be prevented from being written on the recording medium during non-recording.

Figure 12:
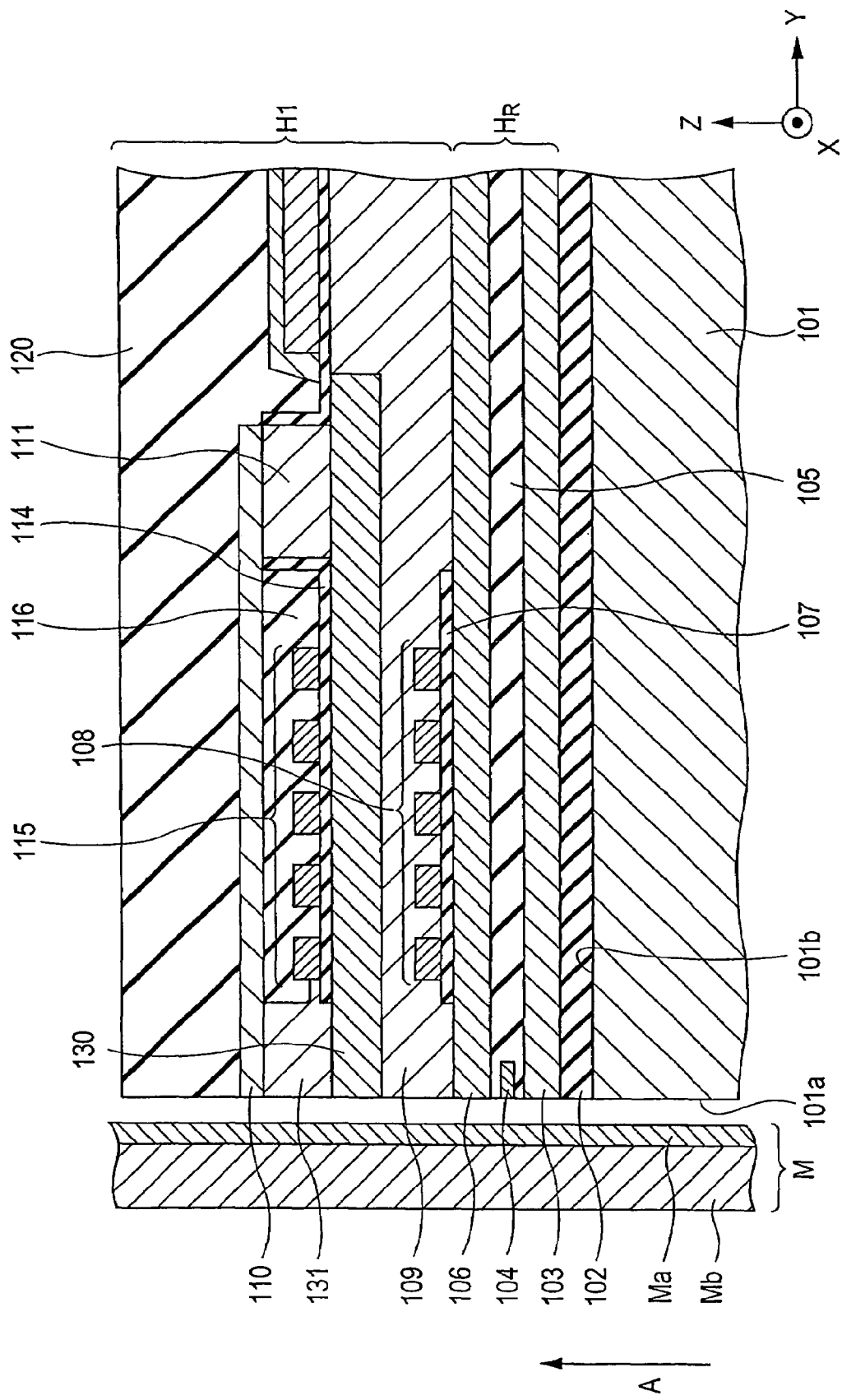
FIG. 12 is a vertical sectional view of a magnetic head according to a seventh embodiment of the present invention.
Figure 13:
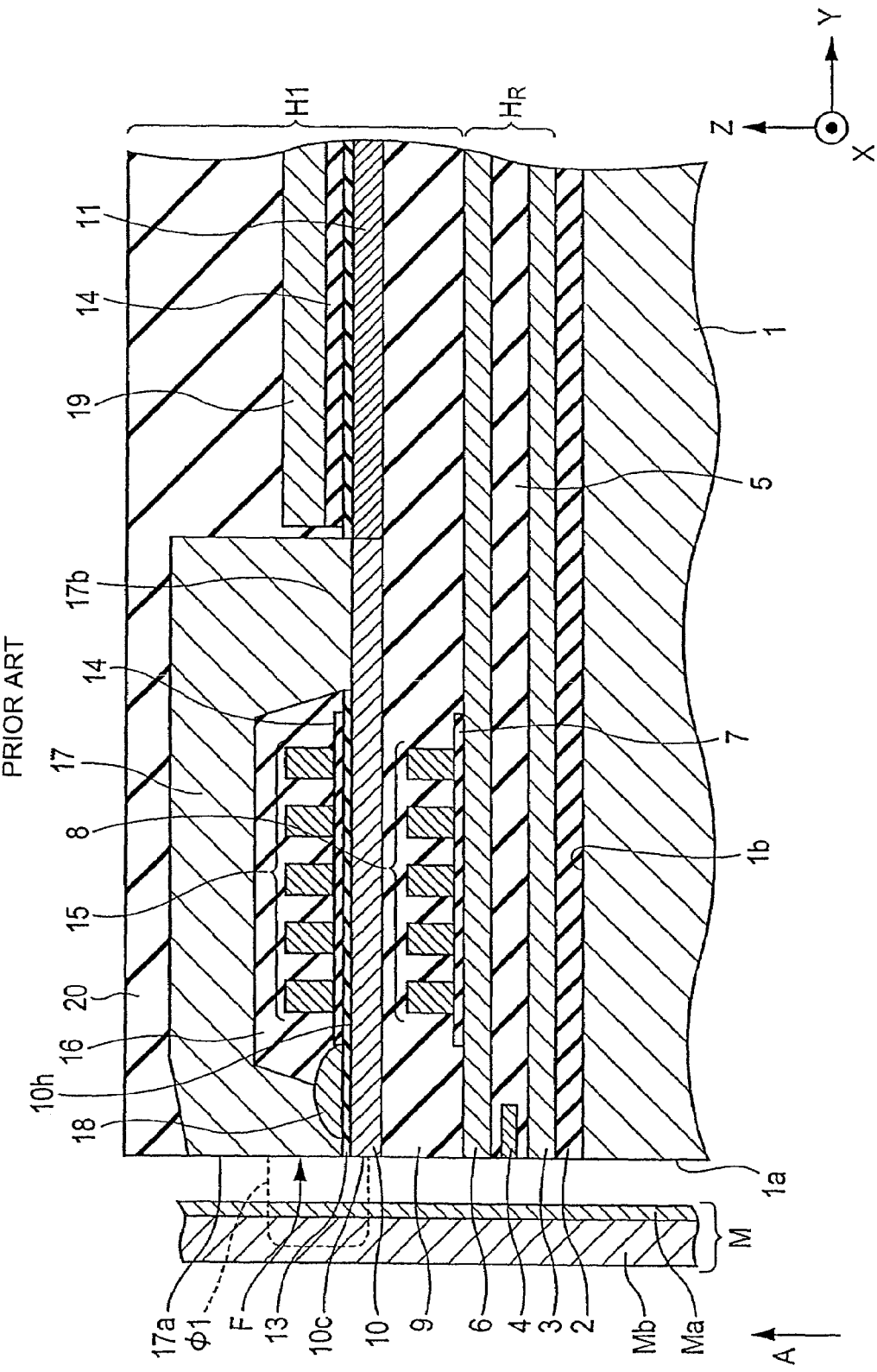
FIG. 13 is a vertical sectional view of a known magnetic head.
Figure 14:
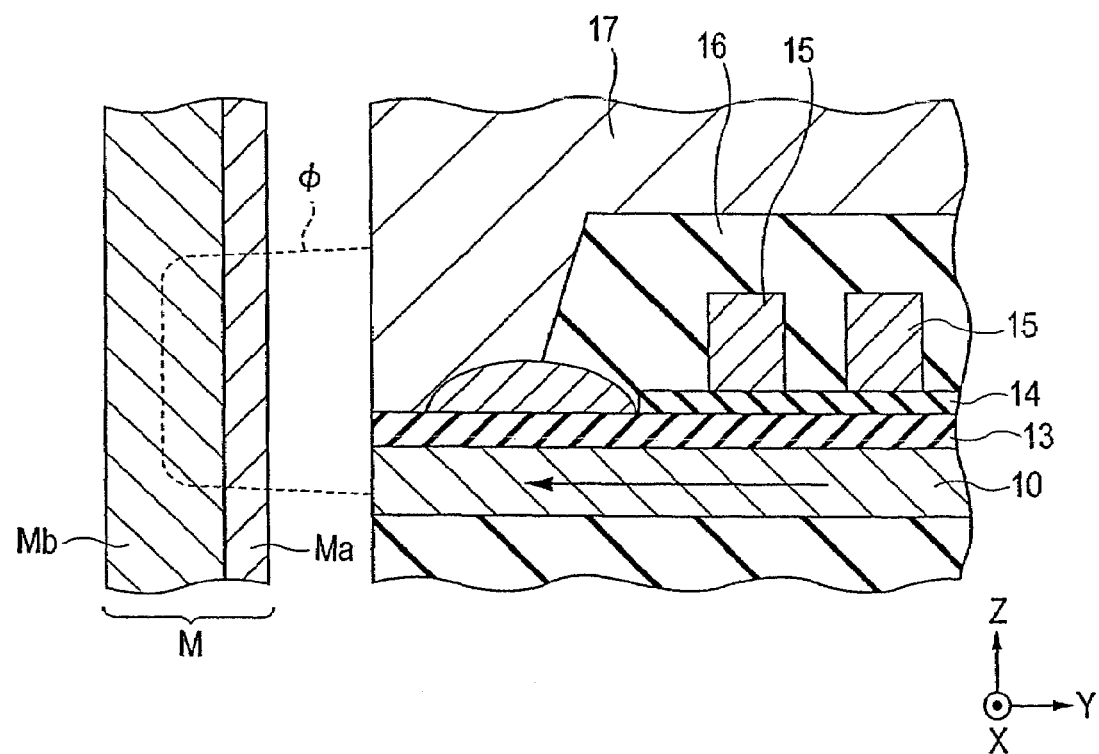
FIG. 14 is an enlarged fragmentary sectional view of the periphery of a face of the magnetic head shown in FIG. 13, the face being opposed to a recording medium.

FIG. 12 is a vertical sectional view of a magnetic head according to a seventh embodiment of the present invention. This magnetic head has a configuration similar to that of the magnetic head shown in FIG. 11 but differs from the magnetic head shown in FIG. 11 in that this magnetic head includes a main magnetic pole layer 110 and a return path layer 117 disposed therebelow. This magnetic head has a face opposed to a recording medium.

This magnetic head further includes a switching layer 131 disposed between this main magnetic pole layer 110 and this return path layer 117.

If this switching layer 131 is rendered non-magnetic during recording with this magnetic head, the magnetization of this main magnetic pole layer 110 is directed perpendicularly to the opposed face of this magnetic head and a magnetic field emanating from the front end face of this main magnetic pole layer 110 to the recording medium is generated, whereby magnetic recording signals are written on the recording medium. Even if the magnetization of this main magnetic pole layer 110 is directed perpendicularly to the opposed face of this magnetic head when this magnetic head is put into a non-recording mode by stopping the supply of a current to a coil layer included in this magnetic head, a magnetic field emanating from the front end face of this main magnetic pole layer 110 to outside this magnetic head can be prevented from being generated. This is because, in this embodiment, a magnetic circuit including this main magnetic pole layer 110, this switching layer 131, and this return path layer 117 is formed by rendering this switching layer 131 magnetic. Therefore, unintended data can be prevented from being written on the recording medium during non-recording.

What is claimed is:

1. A magnetic head comprising:
   a first magnetic layer in which a face, opposed to a recording medium, having a size equal to a track width in a track width direction;
   a second magnetic layer in which a face, opposed to the recording medium, having a size greater than the track width in the track width direction, the first and second magnetic layers being spaced from each other in an element thickness direction, the first and second magnetic layers being connected to each other at a region located in a height direction; and
   a coil layer, located far from the opposed faces, for applying recording magnetic fields to the first and second magnetic layers such that magnetic data is recorded on the recording medium with a perpendicular magnetic field concentrated on the first magnetic layer,
   wherein a switching layer is disposed in a space between the first and second magnetic layers, the space being located close to the opposed faces
   wherein the switching layer is connected to the coil layer, the switching layer including a magnetic alloy having a Curie temperature lower than that of the first magnetic layer and that of the second magnetic layer; and, the switching layer is rendered non-magnetic by supplying a current to the coil layer so as to heat the switching layer to a temperature greater than the Curie temperature of the switching layer when a signal is being recorded on the recording medium; and, the switching layer is rendered magnetic by not supplying a current so as to keep a switching layer temperature less than the Curie temperature of the switching layer when a signal is not being recorded on the recording medium.

2. The magnetic head according to claim 1, wherein the switching layer has a Curie temperature in the range of 120° C. to 180° C.

3. The magnetic head according to claim 1, wherein the switching layer, the first magnetic layer, the second magnetic layer are directly connected to each other.

4. The magnetic head according to claim 1, further comprising insulating layers each disposed between the switching layer and the first or second magnetic layer.

5. The magnetic head according to claim 1, wherein the front end face of the switching layer is located close to the opposed faces and spaced from the opposed faces in the height direction.

6. The magnetic head according to claim 1, wherein the switching layer is heated by supplying a current to the switching layer.

* * * * *